(12) United States Patent
Shiohara

(10) Patent No.: US 11,150,768 B2
(45) Date of Patent: *Oct. 19, 2021

(54) POSITION DETECTION DEVICE, DISPLAY DEVICE, AND POSITION DETECTION METHOD

(71) Applicant: SEIKO EPSON CORPORATION, Tokyo (JP)

(72) Inventor: Ryuichi Shiohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

This patent is subject to a terminal disclaimer.

(21) Appl. No.: 16/658,771

(22) Filed: Oct. 21, 2019

(65) Prior Publication Data
US 2020/0125213 A1 Apr. 23, 2020

(30) Foreign Application Priority Data
Oct. 22, 2018 (JP) .............................. JP2018-198488

(51) Int. Cl.
*H04N 9/31* (2006.01)
*G03B 21/14* (2006.01)
(Continued)

(52) U.S. Cl.
CPC ........... *G06F 3/0425* (2013.01); *G03B 21/14* (2013.01); *G03B 21/206* (2013.01);
(Continued)

(58) Field of Classification Search
CPC ............... G06F 3/0425; G06F 3/03545; G06F 3/04883; G06F 3/0346; G06F 3/017;
(Continued)

(56) References Cited

U.S. PATENT DOCUMENTS 6,339,748 B1 * 1/2002 Hiramatsu ........... G01B 11/002
345/156
6,847,356 B1 * 1/2005 Hasegawa ........... G06F 3/03542
345/157
(Continued)

FOREIGN PATENT DOCUMENTS

JP    2007-088806 A    4/2007
JP    2011-028629 A    2/2011
(Continued)

*Primary Examiner* — Michelle M Iacoletti
*Assistant Examiner* — Magda Cruz
(74) *Attorney, Agent, or Firm* — Dority & Manning, P.A.

(57) ABSTRACT

A projector includes an imaging section configured to generate imaging data obtained by taking an image of first infrared light with a first wavelength emitted by a first pointing member, second infrared light with a second wavelength emitted by a second pointing member, and a target range, and a position detection section for detecting a first position and a second position with respect to the target range based on the imaging data so as to be distinguished from each other, and the imaging section includes a sensor configured to output detection values of first colored light, second colored light, and third colored light to generate the imaging data including the detection values obtained by detecting the first infrared light and the second infrared light with the sensor.

15 Claims, 8 Drawing Sheets

(51) Int. Cl.
- *G03B 21/20* (2006.01)
- *G06F 3/042* (2006.01)
- *G06F 3/0354* (2013.01)

(52) U.S. Cl.
CPC ....... *G06F 3/03545* (2013.01); *H04N 9/3155* (2013.01); *H04N 9/3182* (2013.01); *H04N 9/3185* (2013.01); *H04N 9/3188* (2013.01); *G03B 21/2033* (2013.01)

(58) Field of Classification Search
CPC .. G06F 3/0488; G06F 3/04186; G06F 3/0325; G06F 3/042; G06F 3/0442; G06F 3/03542; G06F 3/0386; H04N 9/3155; H04N 9/3194; H04N 9/3179; H04N 9/3185; H04N 9/3188; H04N 9/3182; G03B 21/2033; G03B 21/206; G03B 21/14
See application file for complete search history.

(56) References Cited

U.S. PATENT DOCUMENTS

| | | | |
|---|---|---|---|
| 2007/0065022 A1 | 3/2007 | Miyamoto | |
| 2011/0169756 A1 | 7/2011 | Ogawa et al. | |
| 2011/0242060 A1* | 10/2011 | McGibney | G06F 3/03545 345/179 |
| 2012/0098746 A1* | 4/2012 | Ogawa | G02B 13/06 345/158 |
| 2012/0212415 A1* | 8/2012 | Yokobayashi | G06F 3/0425 345/158 |
| 2012/0242880 A1 | 9/2012 | Kubo | |
| 2013/0300658 A1 | 11/2013 | Endo et al. | |
| 2015/0035995 A1* | 2/2015 | Uchiyama | G06F 3/01 348/189 |
| 2016/0140745 A1* | 5/2016 | Natori | G06F 3/03545 345/629 |
| 2017/0237955 A1* | 8/2017 | Koyama | H04N 9/3194 348/745 |
| 2017/0322672 A1* | 11/2017 | Kitani | G06F 3/04186 |
| 2018/0074654 A1* | 3/2018 | Tanaka | G06F 3/017 |
| 2018/0217683 A1* | 8/2018 | Kobayashi | G06F 3/041 |
| 2020/0124954 A1* | 4/2020 | Shiohara | G06F 3/0425 |

FOREIGN PATENT DOCUMENTS

| | | | | |
|---|---|---|---|---|
| JP | 2011-145762 A | | 7/2011 | |
| JP | 2013-149155 A | | 8/2013 | |
| JP | 2013149155 A | * | 8/2013 | .......... G06F 3/0354 |
| JP | 2013-235416 A | | 11/2013 | |
| JP | 2015-215925 A | | 12/2015 | |
| JP | 2017-142726 A | | 8/2017 | |
| JP | 2017142726 A | * | 8/2017 | ............. G03B 21/14 |

* cited by examiner

POSITION DETECTION DEVICE, DISPLAY DEVICE, AND POSITION DETECTION METHOD

The present application is based on, and claims priority from JP Application Serial Number 2018-198488, filed Oct. 22, 2018, the disclosure of which is hereby incorporated by reference herein in its entirety.

BACKGROUND

1. Technical Field

The present disclosure relates to a position detection device, a display device, and a position detection method.

2. Related Art

In the past, there has been known a system for identifying a plurality of electronic pens to detect operation positions when the plurality of electronic pens is operated on a screen on which a display image is displayed by a projector or the like (see, e.g., JP-A-2017-142726 (Document 1)). The system described in Document 1 uses a CMOS image sensor and an optical filter wheel provided with two optical filters as a configuration for detecting a plurality of electronic pens different from each other in wavelength of the infrared light to be emitted. In this configuration, due to a rotation of the optical filter wheel, light beams respectively transmitted through two types of optical filters are alternately detected by the image sensor.

SUMMARY

The present disclosure is made in view of the circumstances described above, and has an advantage of realizing a device for identifying a plurality of operation devices for emitting light to detect the operation positions with a simple configuration.

An aspect of the present disclosure is directed to a position detection device including an imaging section configured to generate imaging data obtained by taking an image of first infrared light with a first wavelength emitted by a first pointing member, second infrared light with a second wavelength emitted by a second pointing member, and a target range, and a position detection section configured to detect a first position of the first pointing member with respect to the target range and a second position of the second pointing member with respect to the target range based on the imaging data so as to be distinguished from each other, wherein the imaging section includes a sensor configured to output detection values of first colored light, second colored light, and third colored light to generate the imaging data including the detection values obtained by detecting the first infrared light and the second infrared light with the sensor.

The position detection device described above may be configured such that the sensor is formed of an image sensor including a plurality of detection pixels, the imaging section outputs the imaging data including the detection values of the first colored light, the second colored light, and the third colored light corresponding to each of the detection pixels, and the position detection section detects the first position and the second position from one piece of the imaging data including the one detection value corresponding to each of the detection pixels.

The position detection device described above may be configured such that the sensor has a sensitivity characteristic in which relative sensitivity of the first colored light, the second colored light, and the third colored light at the first wavelength fails to coincide with relative sensitivity of the first colored light, the second colored light, and the third colored light at the second wavelength.

The position detection device described above may be configured such that the first wavelength includes a wavelength shorter than the second wavelength, and the imaging section includes an optical filter configured to cut light in a wavelength band shorter in wavelength than the first wavelength, and the sensor detects light transmitted through the optical filter.

The position detection device described above may be configured such that the optical filter cuts light with a wavelength in an ultraviolet region.

An aspect of the present disclosure is directed to a display device including an image display section configured to display an image based on image data on a display surface, an imaging section configured to generate imaging data obtained by taking an image of first infrared light with a first wavelength emitted by a first pointing member, second infrared light with a second wavelength emitted by a second pointing member, and at least a part of the display surface, a position detection section configured to detect a first position of the first pointing member with respect to the display surface and a second position of the second pointing member with respect to the display surface based on the imaging data so as to be distinguished from each other, and a processing section configured to perform a first process corresponding to the first position and a second process corresponding to the second position, and the imaging section includes a sensor configured to output detection values of first colored light, second colored light, and third colored light to generate the imaging data including the detection values obtained by detecting the first infrared light and the second infrared light with the sensor.

The display device described above may be configured such that the processing section performs processes of performing drawings different from each other as the first process and the second process.

An aspect of the present disclosure is directed to a display system including a display device including an image display section configured to display an image based on image data on a display surface, and a first pointing member and a second pointing member used for a position pointing operation on the display surface, wherein the first pointing member emits first infrared light with a first wavelength, the second pointing member emits second infrared light with a second wavelength, the display device includes an imaging section configured to generate imaging data obtained by taking an image of the first infrared light emitted by the first pointing member, the second infrared light emitted by the second pointing member, and at least a part of the display surface, a position detection section configured to detect a first position of the first pointing member with respect to the display surface and a second position of the second pointing member with respect to the display surface based on the imaging data so as to be distinguished from each other, and a processing section configured to perform a first process corresponding to the first position and a second process corresponding to the second position, and the imaging section includes an optical sensor configured to output detection values of first colored light, second colored light, and third colored light to generate the imaging data including the detection values obtained by detecting the first infrared light and the second infrared light with the optical sensor.

The display system described above may be configured such that the first pointing member and the second pointing member each include an operation sensor configured to detect an operation, a light source, and a light emission control section configured to make the light source emit light when the operation sensor detected the operation.

An aspect of the present disclosure is directed to a position detection method including an imaging step of generating imaging data obtained by taking an image of first infrared light with a first wavelength emitted by a first pointing member, second infrared light with a second wavelength emitted by a second pointing member, and a target range, and a detection step of detecting a first position of the first pointing member with respect to the target range and a second position of the second pointing member with respect to the target range based on the imaging data generated in the imaging step so as to be distinguished from each other, wherein in the imaging step, there is used an imaging section including a sensor configured to output detection values of first colored light, second colored light, and third colored light to generate the imaging data including the detection values obtained by detecting the first infrared light and the second infrared light with the sensor.

The present disclosure can be implemented in a variety of aspects other than the position detection device, the display device, and the position detection method described above. For example, the present disclosure can be implemented as a program executed by a computer (or a processor) for executing the method described above. Further, the present disclosure can be implemented as a recording medium storing the program described above, a server for delivering the program, a transmission medium for transmitting the program described above, and a data signal including the computer program described above and embodied in a carrier wave.

DESCRIPTION OF EXEMPLARY EMBODIMENTS

General Description of Projection System

Figure 1:
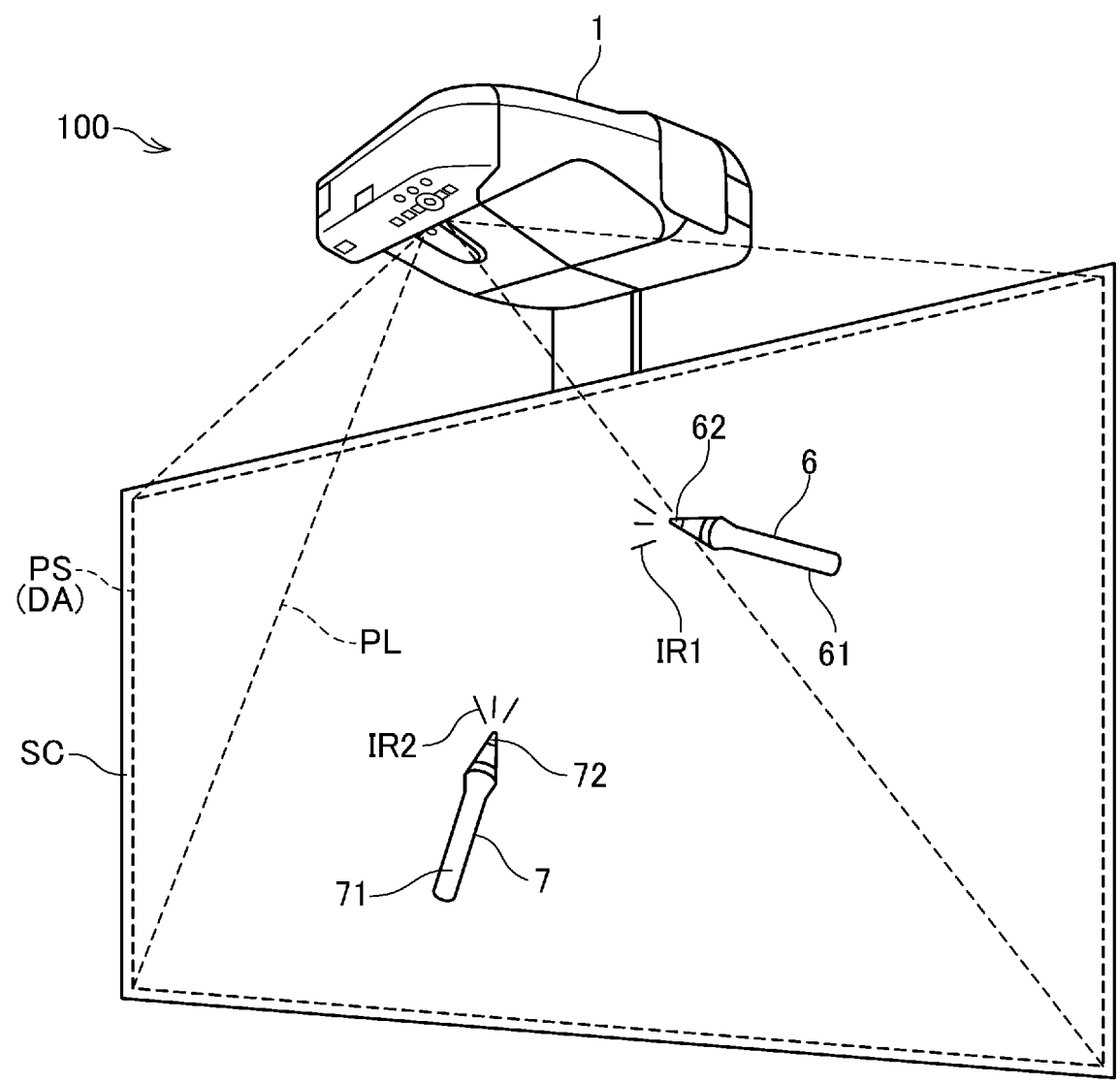
FIG. 1 is a schematic configuration diagram of a projection system.

FIG. 1 is a perspective view of a projection system 100 in an embodiment of the present disclosure. The projection system 100 has a projector 1, a first pointing member 6, and a second pointing member 7.

The projector 1 functions as a display device, and projects image light PL on a screen SC as a display surface to display an image on the display surface. The projection system 100 corresponds to a display system. Further, the projector 1 also functions as a position detection device for detecting pointing positions of the first pointing member 6 and the second pointing member 7 as detection target devices. In this case, the projection system 100 functions as a detection system.

The projector 1 projects the image light PL on the screen SC to thereby form a projection image PS on the screen SC. The projection image PS denotes an area of the image projected on the screen SC by the projector 1. In a normal use situation of the projector 1, the projection image PS is projected so as to fit into the screen SC.

A target range DA where the projector 1 detects the positions of the first pointing member 6 and the second pointing member 7 can be set as an arbitrary range including at least a part of the screen SC. Optimally, a range including the projection image PS is set as the target range DA. In the present embodiment, the range in which the projection image PS is projected is set as the target range DA.

The first pointing member 6 is a pointing member used by the user holding a shaft part 61 shaped like a pen in hand. The second pointing member 7 is a pointing member used by the user holding a shaft part 71 shaped like a pen in hand. When an operation of pressing a tip 62 against the screen SC is performed by the user, the first pointing member 6 emits infrared light from the tip 62. When an operation of pressing a tip 72 against the screen SC is performed by the user, the second pointing member 7 similarly emits infrared light from the tip 72. The projector 1 detects the infrared light emitted by the first pointing member 6 and the infrared light emitted by the second pointing member 7 to thereby detect the operation positions of the first pointing member 6 and the second pointing member 7. On this occasion, the projector 1 detects the operation position of the first pointing member 6 and the operation position of the second pointing member 7 so as to be distinguished from each other. The light emitted by the first pointing member 6 is defined as first infrared light IR1, and the light emitted by the second pointing member 7 is defined as second infrared light IR2.

In the present embodiment, there is described a configuration using two pointing members including one first pointing member 6 and one second pointing member 7. The number of pointing members which can be used in the projection system 100 is arbitrary, and can be three or more.

Configuration of Pointing Members

Figure 2:
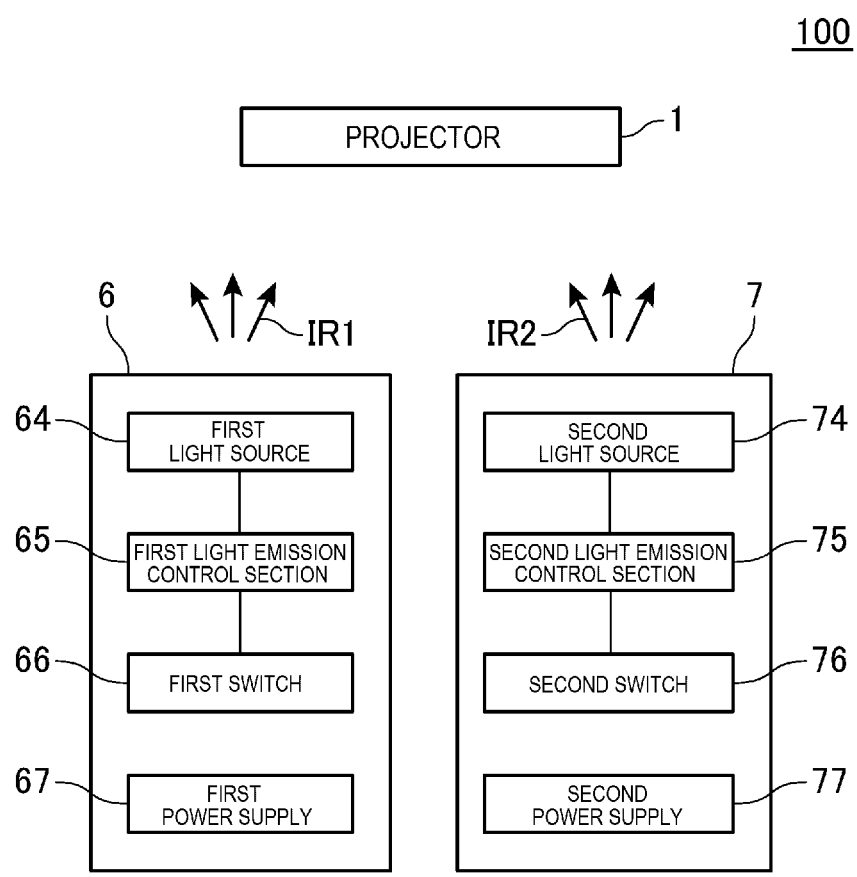
FIG. 2 is a block diagram of the projection system.

FIG. 2 is a block diagram of the projection system 100, and in particular shows a configuration of the first pointing member 6 and the second pointing member 7 in detail.

The first pointing member 6 is provided with a first light source 64 for emitting the infrared light, a first light emission control section 65 for putting the first light source 64 on, and a first switch 66 for detecting pressure on the tip 62. The first pointing member 6 is provided with a first power supply 67 for supplying other sections in the first pointing member 6 with electrical power. The first light source 64 corresponds to a light source, the first light emission control section 65 corresponds to a light emission control section, and the first switch 66 corresponds to an operation sensor.

The first light source 64 is provided with a light emitting element such as an infrared light emitting diode (LED), and is coupled to the first light emission control section 65.

The first switch 66 is a switch-type sensor which is set to the ON state when pressure is applied to the tip 62, and is switched to the OFF state when the pressure on the tip 62 is removed. The first switch 66 is coupled to the first light emission control section 65, and it is possible for the first light emission control section 65 to detect whether the first switch 66 is in the ON state or the OFF state.

The first light emission control section 65 detects the state of the first switch 66, and then puts the first light source 64 on when the first switch 66 is in the ON state. For example, the first light emission control section 65 outputs an electrical current with a predetermined voltage or a pulse current to the first light source 64 to thereby put the first light source 64 on.

The second pointing member 7 is provided with a second light source 74 for emitting the infrared light, a second light emission control section 75 for putting the second light source 74 on, and a second switch 76 for detecting pressure on the tip 72. The second pointing member 7 is provided with a second power supply 77 for supplying other sections in the second pointing member 7 with electrical power. The second light source 74 corresponds to a light source, the second light emission control section 75 corresponds to a light emission control section, and the second switch 76 corresponds to an operation sensor.

The second light source 74 is provided with a light emitting element such as an infrared LED, and is coupled to the second light emission control section 75.

The second switch 76 is a switch-type sensor which is set to the ON state when pressure is applied to the tip 72, and is switched to the OFF state when the pressure on the tip 72 is removed. The second switch 76 is coupled to the second light emission control section 75, and it is possible for the second light emission control section 75 to detect whether the second switch 76 is in the ON state or the OFF state.

The second light emission control section 75 detects the state of the second switch 76, and then puts the second light source 74 on when the second switch 76 is in the ON state. For example, the second light emission control section 75 outputs an electrical current with a predetermined voltage or a pulse current to the second light source 74 to thereby put the second light source 74 on.

The first light source 64 and the second light source 74 both emit the light included in an infrared region of the wavelength of 700 nm ($0.7 \times 10^{-9}$ m) through 1,000 nm. Optimally, the first light source 64 and the second light source 74 each emit the light included in a near infrared region of the wavelength of 700 nm through 2,500 nm. In the present embodiment, the first light source 64 and the second light source 74 emit the light beams different in wavelength from each other, and specifically, the first infrared light IR1 emitted by the first light source 64 includes light in the wavelength band of a 760 nm band, and the second infrared light IR2 emitted by the second light source 74 includes light in the wavelength band of a 850 nm band. Alternatively, the infrared light IR2 can also be light including light in the wavelength band of a 940 nm band. The first infrared light IR1 and the second infrared light IR2 are each not required to be a light beam with a single wavelength. In this case, it is preferable for the first infrared light IR1 and the second infrared light IR2 not to include the light beams the same in wavelength.

Configuration of Projector

Figure 3:
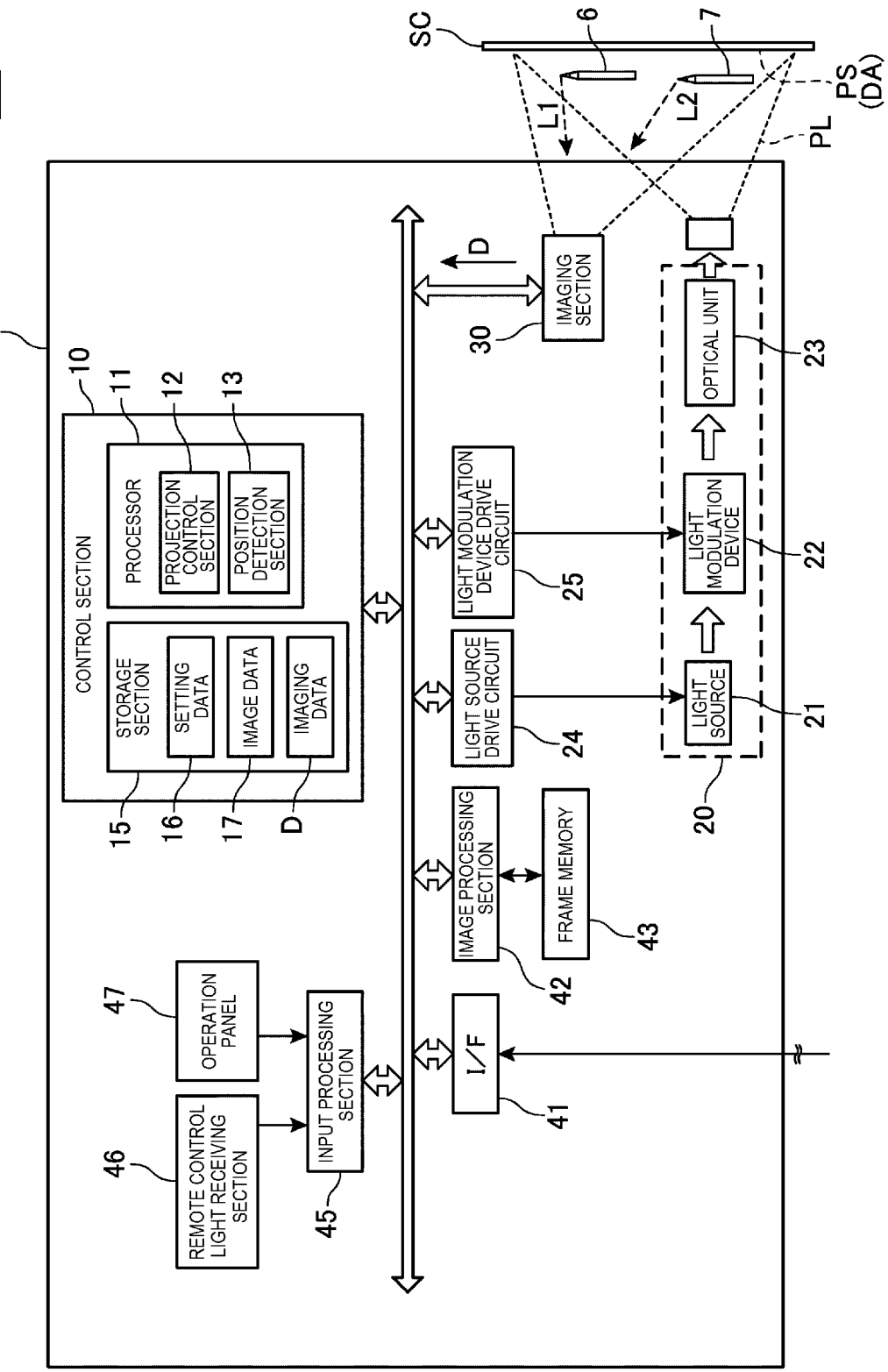
FIG. 3 is a block diagram of the projection system.

FIG. 3 is a block diagram of the projection system 100, and in particular shows a configuration of the projector 1 in detail.

The projector 1 is provided with a control section 10 for controlling each section of the projector 1. The control section 10 can also be a device provided with, for example, an arithmetic processing device for executing a program to realize the function of the control section 10 due to the cooperation of hardware and software. Alternatively, it is also possible for the control section 10 to be configured by the hardware in which the arithmetic processing function is programmed. In the present embodiment, as an example, the control section 10 denotes a configuration provided with a storage section 15 for storing the program, and a processor 11 for executing the program. The processor 11 is an arithmetic processing device formed of a CPU (central processing unit), a microcomputer, or the like. The processor 11 executes the control program stored in the storage section 15 to control each section of the projector 1.

The storage section 15 has a nonvolatile storage area for storing the program to be executed by the processor 11 and data to be processed by the processor 11 in a nonvolatile manner. It is also possible for the storage section 15 to be a device provided with a volatile storage area to form a working area for temporarily storing the program to be executed by the processor 11 and the data as the processing target.

For example, in the present embodiment, the storage section 15 stores setting data 16, image data 17, and imaging data D. The setting data 16 includes setting values related to processing conditions of a variety of types of processing performed by the processor 11. The setting data 16 includes setting values related to image processing performed by an image processing section 42.

The image data 17 is image data input from an interface 41 described later. A projection control section 12 makes a projection section 20 project an image based on the image data 17.

The imaging data D is data of a taken image taken by an imaging section 30.

The processor 11 can be formed of a single processor, or can also be formed of a plurality of processors. The processor 11 can also be formed of an SoC (system-on-chip) integrated with a part or the whole of the storage section 15 and/or other circuits. Further, as described above, the processor 11 can also be formed of a combination of the CPU for executing the program and a DSP (digital signal processor) for executing predetermined arithmetic processing. It is also possible to adopt a configuration in which all of the functions of the processor 11 are implemented in the hardware, or it is also possible to configure all of the functions of the processor 11 using a programmable device. Further, it is also possible for the processor 11 to also function as the image processing section 42. In other words, it is also possible for the processor 11 to perform the function of the image processing section 42.

The processor 11 is provided with a projection control section 12 for performing the control of projecting the image light PL. Further, the processor 11 is provided with a position detection section 13 for detecting the operation positions of the first pointing member 6 and the second pointing member 7.

It is obviously possible to partially configure the projection control section 12 and the position detection section 13 with separate hardware from the processor 11.

The projector 1 is provided with the projection section 20. The projection section 20 is provided with a light source 21, a light modulation device 22, and an optical unit 23. To the projection section 20, there are coupled a light source drive circuit 24 and a light modulation device drive circuit 25 operating in accordance with the control by the control section 10. The projection section 20 corresponds to an image display section.

The light source 21 is formed of a solid-state light source such as an LED or a laser source. It should be noted that the light source 21 can also be a lamp such as a halogen lamp, a xenon lamp, or a super high-pressure mercury lamp. Further, the light source 21 can also be a light source for emitting light different in wavelength from the first infrared light IR1 and the second infrared light IR2. Alternatively, the light source 21 is formed of a solid-state light source such as an LED or a laser source. The light source 21 is driven by the light source drive circuit 24 to emit the light. It is also possible for the projector 1 to be provided with a drive circuit for supplying the light source 21 with the electrical power in accordance with the control by the control section 10.

The light modulation device 22 modulates the light emitted by the light source 21 to generate the image light PL, and then irradiates the optical unit 23 with the image light PL. The light modulation device 22 is provided with a light modulation element such as a transmissive liquid crystal light valve, a reflective liquid crystal light valve, or a digital mirror device. The light modulation element of the light modulation device 22 is coupled to the light modulation device drive circuit 25. The light modulation device drive circuit 25 drives the light modulation element of the light modulation device 22 to sequentially form the light modulation element of the light modulation device 22 line by line, and finally form the image frame by frame. It is also possible for the light modulation device 22 to be provided with a drive circuit for driving the light modulation element. For example, when the light modulation device 22 is formed of a liquid crystal light valve, it is also possible to provide a liquid crystal driver circuit as the drive circuit.

The optical unit 23 is provided with an optical element such as a lens or a mirror, and focuses the image light PL modulated by the light modulation device 22 on the screen SC to display the projection image PS based on the image data 17 on the screen SC.

As shown in FIG. 1, the projector 1 can also be provided with an interface 41, an image processing section 42, and an input processing section 45. These sections are coupled to the control section 10.

The interface 41 is an interface to which the image data is input, and is provided with a connector to which a transmission cable not shown is coupled, and an interface circuit for receiving the image data via the transmission cable.

To the interface 41, it is possible to couple an image supply device for supplying the image data. As the image supply device, it is possible to use, for example, a notebook personal computer (PC), a desktop PC, a tablet terminal, a smartphone, and a personal digital assistant (PDA). The image supply device can also be a video reproduction device, a DVD (digital versatile disk) player, a Blu-ray disc player, or the like. The image supply device can also be a hard disk recorder, a television tuner device, a set-top box for a CATV (cable television), a video gaming machine, or the like. The image data to be input to the interface 41 can be moving image data, or still image data, and any data format can be adopted.

The image processing section 42 processes the image data input to the interface 41. To the image processing section 42, there is coupled a frame memory 43. The image processing section 42 processes the image data of the image to be projected by the projection section 20 in accordance with the control by the projection control section 12. It is also possible to assume that the image processing section 42 performs the processing by only a part of the area of the frame memory 43, namely by several lines through several tens of lines, but does not perform the processing using the frame memory 43 as the frame memory of the entire screen.

The image processing section 42 performs a variety of types of processing including, for example, a geometric correction process for correcting a keystone distortion of the projection image PS, and an OSD (on-screen display) process for superimposing an OSD image. It is also possible for the image processing section 42 to perform an image adjustment process for adjusting a luminance or a color on the image data. It is also possible for the image processing section 42 to perform a resolution conversion process for adjusting the aspect ratio and the resolution of the image data so as to correspond to the light modulation device 22. It is also possible for the image processing section 42 to perform other image processing such as a frame rate conversion.

The image processing section 42 generates an image signal based on the image data on which the process has been performed, and then outputs the image signal to the light modulation device 22. The projection control section 12 makes the light modulation device 22 operate based on the image signal output by the image processing section 42 to make the projection section 20 project the image light PL.

The input processing section 45 receives an input to the projector 1. The input processing section 45 is coupled to a remote control light receiving section 46 for receiving an infrared signal transmitted by a remote controller not shown, and an operation panel 47 provided to the main body of the projector 1. The input processing section 45 decodes the signal received by the remote control light receiving section 46 to detect an operation by the remote controller. Further, the input processing section 45 detects an operation on the operation panel 47. The input processing section 45 outputs data representing the operation content to the control section 10.

The projector 1 is provided with the imaging section 30 as a configuration for detecting the pointing operations with the first pointing member 6 and the second pointing member 7 to identify the operation positions.

On the screen SC, there is set the target range DA for detecting the operations of the first pointing member 6 and the second pointing member 7. In the present embodiment, the range where the projection section 20 projects the projection image PS coincides with the target range DA. The imaging section 30 takes an image of an imaging range, namely a field angle, including the target range DA.

The imaging section 30 is a so-called digital camera, and performs the imaging with the control by the position detection section 13, and then outputs the imaging data D to the control section 10. The imaging data D is stored in the storage section 15. Since the field angle of the imaging section 30 includes the target range DA of the operations of the first pointing member 6 and the second pointing member 7 as described above, the imaging data D is the image data obtained by taking an image of the screen SC including the projection image PS. The field angle of the imaging section 30 preferably includes the whole of the target range DA, but can also be a field angle including a part of the target range DA.

The position detection section 13 controls the imaging section 30 to perform the imaging. The imaging section 30 outputs the imaging data D in accordance with the control by the position detection section 13, and the imaging data D output by the imaging section 30 is stored in the storage section 15. The position detection section 13 analyzes the imaging data D to detect the operation position of the first pointing member 6 and the operation position of the second pointing member 7 so as to be distinguished from each other. The operation position of the first pointing member 6 detected by the position detection section 13 corresponds to a first position, and the operation position of the second pointing member 7 corresponds to a second position.

Configuration of Imaging Section

Figure 4:
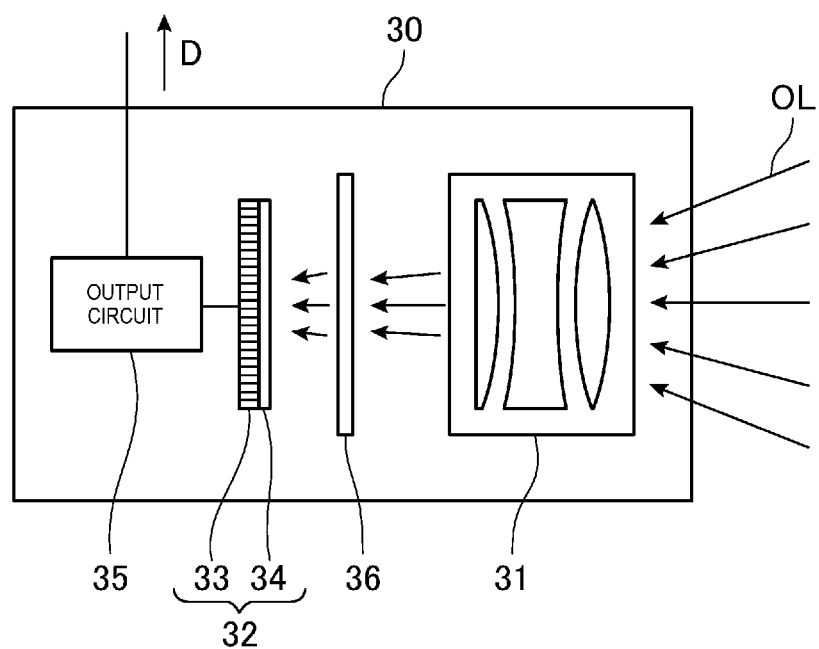
FIG. 4 is a schematic configuration diagram of an imaging section.

FIG. 4 is a schematic configuration diagram of the imaging section 30. In FIG. 4, the light entering the imaging section 30 from outside is defined as incident light OL.

The imaging section 30 is provided with an imaging optical unit 31 having a lens for collecting the incident light OL, and an image sensor 32 for detecting the light collected by the imaging optical unit 31. The image sensor 32 is provided with light receiving elements 33, and a color filter array 34 disposed on the incident side of the light receiving elements 33. To the image sensor 32, there is coupled an output circuit 35 for retrieving the output values of the light receiving elements 33 to generate the imaging data D. The image sensor 32 corresponds to an optical sensor.

Figure 5:
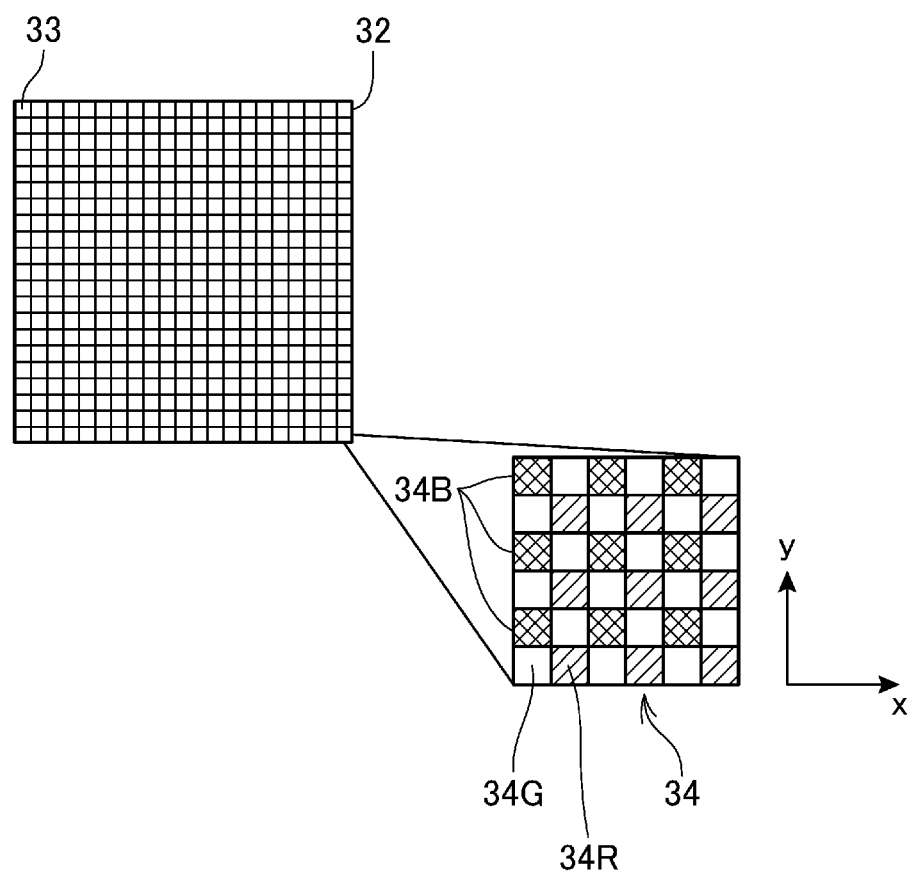
FIG. 5 is a configuration diagram of an image sensor.

FIG. 5 is a configuration diagram of the image sensor 32.

The image sensor 32 is formed of, for example, a CMOS (complementary metal oxide semiconductor) image sensor or a CCD (charge coupled device) image sensor. The image sensor 32 is constituted by a number of light receiving elements 33 arranged in a matrix. Each of the light receiving elements 33 corresponds to a detection pixel.

The color filter array 34 is disposed so as to overlap the respective light receiving elements 33 arranged on the image sensor 32. The color filter array 34 is a filter having a plurality of color filters arranged so as to correspond to the positions of the respective light receiving elements 33. The color filters of the color filter array 34 include red-filters 34R, blue-filters 34B, and green-filters 34G, and are each arranged in a checkered pattern. FIG. 5 shows an example in which the color filters are arranged in a matrix to form the checkered pattern along the rows in the x direction and the columns in the y direction in the color filter array 34.

The red-filters 34R are each a filter for attenuating or blocking the light with the wavelength other than that of the red light in order to make the light receiving element 33 detect the red light. The light receiving elements 33 overlapping the red-filters 34R receive and detect the red light.

Further, the blue-filters 34B are each a filter for attenuating or blocking the light with the wavelength other than that of the blue light in order to make the light receiving element 33 detect the blue light. The light receiving elements 33 overlapping the blue-filters 34B receive and detect the blue light.

The green-filters 34G are each a filter for attenuating or blocking the light with the wavelength other than that of the green light in order to make the light receiving element 33 detect the green light. The light receiving elements 33 overlapping the green-filters 34G receive and detect the green light.

As described above, the image sensor 32 detects the red color, the blue color, and the green color with the light receiving elements 33 using the color filter array 34, and then outputs the detection values.

The red-filters 34R, the blue-filters 34B, and the green-filters 34G are arbitrarily arranged in the color filter array 34, and are arranged in accordance with, for example, a Bayer arrangement. In this case, the color filter array 34 includes rows in which the red-filters 34R and the green-filters 34G are alternately arranged in the x direction, and rows in which the blue-filters 34B and the green-filters 34G are alternately arranged, and these rows are alternately arranged in the y direction. In this example, the green-filters 34G are arranged in higher density than those of the red-filters 34R and the blue-filters 34B corresponding to the fact that the visual feature of the human is sensitive to the luminance of a green color.

The configuration of the color filter array 34 shown in FIG. 5 is illustrative only. It is also possible for the color filter array 34 to have a configuration including transparent filters for a white color in addition to the red-filters 34R, the blue-filters 34B, and the green-filters 34G. Further, as the color filter array 34, it is also possible to adopt a configuration using color filters of complementary colors including filters for cyan, filters for magenta, and filters for yellow.

Going back to FIG. 4, the output circuit 35 samples the detection value of each of the light receiving elements 33 constituting the image sensor 32. The output circuit 35 performs a variety of types of processing such as an interpolation process for each pixel, a white balance adjustment process, a color separation process, and a false color suppression process to generate the imaging data D including the output values of RGB of each pixel.

The imaging data D is still image data including a plurality of pixels, and including the pixel values of the plurality of colors for each pixel. It is also possible for the number of pixels included in the imaging data D to coincide with the number of the light receiving elements 33, or fail to coincide with the number of the light receiving elements 33. The pixel values included in the imaging data D are, for example, data of the colors of R, G, and B, but can also include the pixel values of Y, U, and V as described later. The imaging data D includes a pixel value of a predetermined number of bits for each pixel. In a typical example, the imaging data D includes the RGB data in 24 bits for each pixel.

The specific format of the imaging data D is not limited. For example, the imaging data D can also be RAW data, or the image data in the JPEG (joint photographic experts group) format. Alternatively, it is also possible to adopt the image data in the PNG (portable network graphics) format, or other formats. It is also possible for the output circuit 35 to perform signal processing of converting the output values of RGB into the YUV values to output the imaging data D including the YUV data to the control section 10. For example, it is also possible to treat it as a video output format for sequentially outputting the data in 8 bits for each of RGB, in 24 bits for each pixel, along the rows in the x direction and the columns in the y direction.

The imaging section 30 is provided with an optical filter 36 on an incident side of the image sensor 32, namely the side which the incident light OL enters. The optical filter 36 is a filter for blocking or attenuating the light with a wavelength set in advance. In the present embodiment, it is assumed that the optical filter 36 is a filter for blocking or attenuating the light including a wavelength band corresponding to at least a part of the visible region, and blocks or attenuates the light with the wavelength not longer than 700 nm as a preferable example.

Detection by Imaging Section

Figure 6:
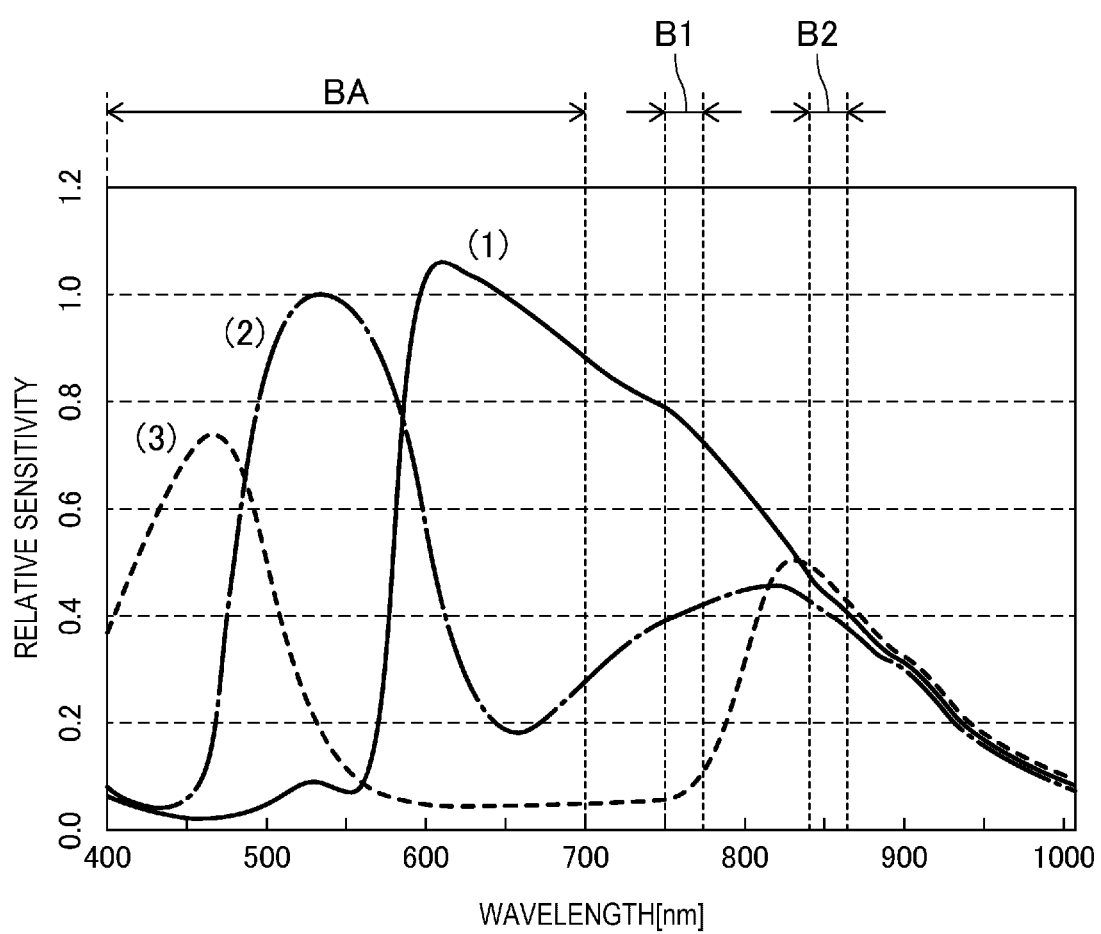
FIG. 6 is a diagram showing light receiving characteristics of the image sensor.

FIG. 6 is a diagram showing light receiving characteristics of the image sensor 32. The horizontal axis in FIG. 6 represents the wavelength, and the vertical axis represents relative sensitivity. FIG. 6 shows correlation between the wavelength and the relative sensitivity of the image sensor 32 with the waveforms indicated by (1), (2), and (3). The waveform (1) represents the relative sensitivity of the red light. The output value of the light receiving element 33 overlapping the red-filter 34R corresponds to the waveform (1) of the relative sensitivity characteristic. Similarly, the waveform (2) represents the relative sensitivity of the green light, and the output value of the light receiving element 33 overlapping the green-filter 34G corresponds to the waveform (2) of the relative sensitivity characteristic. The waveform (3) represents the relative sensitivity of the blue light, and the output value of the light receiving element 33 overlapping the blue-filter 34B corresponds to the waveform (3) of the relative sensitivity characteristic.

In FIG. 6, the wavelength band in which the light is blocked or attenuated by the optical filter 36 is denoted by the reference symbol BA.

The optical filter 36 is not limited to what completely blocks the light in the wavelength band BA, but is only required to be what attenuates the light in the wavelength band BA. For example, it is sufficient for the transmittance in the wavelength band to be no higher than 80%. It should be noted that the transmittance in the wavelength band BA is preferably no higher than several %, and is more preferably set to 0%. In the following description, the expression that the optical filter 36 blocks the light in the wavelength band BA includes blocking the light in the wavelength band BA and attenuating the light in the wavelength band BA.

The upper limit of the wavelength band BA is set to 700 nm or the vicinity thereof. The lower limit of the wavelength band BA is a wavelength shorter than 400 nm indicated on the horizontal axis in FIG. 6, and can be set to 380 nm, 350 nm, or a smaller value. In other words, the optical filter 36 blocks at least light in a wavelength band of 400 nm through 700 nm. Further, the optical filter 36 can also be a filter for blocking light with a wavelength in an ultraviolet region shorter than 400 nm.

When the wavelength band BA includes the wavelength in a range not shorter than 380 nm and not longer than 700 nm, most of the visible light is blocked by the optical filter 36. So-called blue light is the light with the wavelength of 460 nm and the vicinity thereof, and includes the light with the wavelength of substantially 450 nm through 495 nm. So-called green light is the light with the wavelength of 555 nm and the vicinity thereof, and includes the light with the wavelength of substantially 495 nm through 570 nm. So-called red light includes the light with the wavelength of substantially 620 nm through 660 nm. Further, yellow light includes the light at 580 nm and in the vicinity thereof, orange light includes the light with the wavelength of substantially 590 nm through 620 nm. These light beams are all blocked by the optical filter 36. Further, the white light including a plurality of wavelengths in the visible region is also blocked by the optical filter 36.

The relative sensitivity of the image sensor 32 does not become 0 even in the wavelength band not shorter than 700 nm and not longer than 1,000 nm out of the visible region. In other words, the light receiving elements 33 of the image sensor 32 have sensitivity to the light in the infrared region out of the light transmitted through the color filter array 34. Therefore, the image sensor 32 receives the light in the wavelength band other than the wavelength band BA to output a significant output value.

The first infrared light IR1 emitted by the first pointing member 6 includes the light in at least a part of the wavelength band B1 shown in FIG. 6. In this case, the first infrared light IR1 can be said to be the light in the wavelength band of 760 nm. The second infrared light IR2 emitted by the second pointing member 7 includes the light in at least a part of the wavelength band B2 shown in FIG. 6. In this case, the second infrared light IR2 can be said to be the light in the wavelength band of 850 nm. The wavelength band B1 corresponds to a first wavelength, and the wavelength band B2 corresponds to a second wavelength.

In the wavelength band B1, the value of the relative sensitivity (1) of the red light in the image sensor 32 is about 0.8, the value of the relative sensitivity (2) of the green light is about 0.4. Therefore, the image sensor 32 outputs the value corresponding to the output value when the light including the red light and the green light has been received. As a result, in the imaging data D to be output by the output circuit 35, the pixel value of the pixel having received the light in the wavelength band B1 becomes the pixel value corresponding to the orange color.

In the wavelength band B2, the values of the relative sensitivity (1) of the red light, the relative sensitivity (2) of the green light, and the relative sensitivity (3) of the blue light in the image sensor 32 all fall into a range of 0.4 through 0.5. In this case, the image sensor 32 outputs the value corresponding to the output value when the light including the red light, the green light, and the blue light has been received. Therefore, in the imaging data D to be output by the output circuit 35, the pixel value of the pixel having received the light in the wavelength band B2 becomes the pixel value corresponding to the white color.

Therefore, when the first pointing member 6 has emitted the first infrared light IR1, the first infrared light IR1 forms the orange image in the imaging data D. It is possible for the position detection section 13 to detect the position where the first pointing member 6 has emitted the first infrared light IR1 by detecting the orange image from the imaging data D. The position detection section 13 identifies the position of the orange image in the imaging data D to set the position as the operation position of the first pointing member 6. Further, the position detection section 13 performs a conversion process for converting the operation position of the first pointing member 6 in the imaging data D into a position of the first pointing member 6 in the target range DA to detect the operation by the first pointing member 6.

Further, when the second pointing member 7 has emitted the second infrared light IR2, the second infrared light IR2 forms the white image in the imaging data D. It is possible for the position detection section 13 to detect the position where the second pointing member 7 has emitted the second infrared light IR2 by detecting the white image from the imaging data D. The position detection section 13 identifies the position of the white image in the imaging data D to set the position as the operation position of the second pointing member 7. Further, the position detection section 13 performs a conversion process for converting the operation position of the second pointing member 7 in the imaging data D into a position of the second pointing member 7 in the target range DA to detect the operation by the second pointing member 7.

The blue light, the red light, the green light, the white light, and the orange light included in the incident light OL are blocked by the optical filter 36, and therefore do not show in the imaging data D. Therefore, by detecting the pixels of the color corresponding to the sensitivity characteristics in the wavelength band B1 and the wavelength band B2 from the imaging data D, it is possible for the position detection section 13 to detect each of the images of the first infrared light IR1 and the second infrared light IR2 so as to be distinguished from each other.

Here, the color in which the first infrared light IR1 is detected by the image sensor 32 is defined as a first detection color, and the color in which the second infrared light IR2 is detected by the image sensor 32 is defined as a second detection color. The first detection color is a color of the image of the first infrared light IR1 in the imaging data D, and is the orange color in the present embodiment. The second detection color is a color of the image of the second infrared light IR2 in the imaging data D, and is the white color in the present embodiment.

The position detection section 13 has the RGB data of the first detection color and the RGB data of the second detection color in advance. These data are stored in the storage section 15 as the setting data 16, for example. The position detection section 13 detects the pixels corresponding to the RGB data of the first detection color and the pixels corresponding to the RGB data of the second detection color from the imaging data D. The RGB data of the first detection color and the RGB data of the second detection color can also be values of the respective colors of R, G, and B, or can also be data defining the ranges of the values of the respective colors.

Operation of Projector

Figure 7:
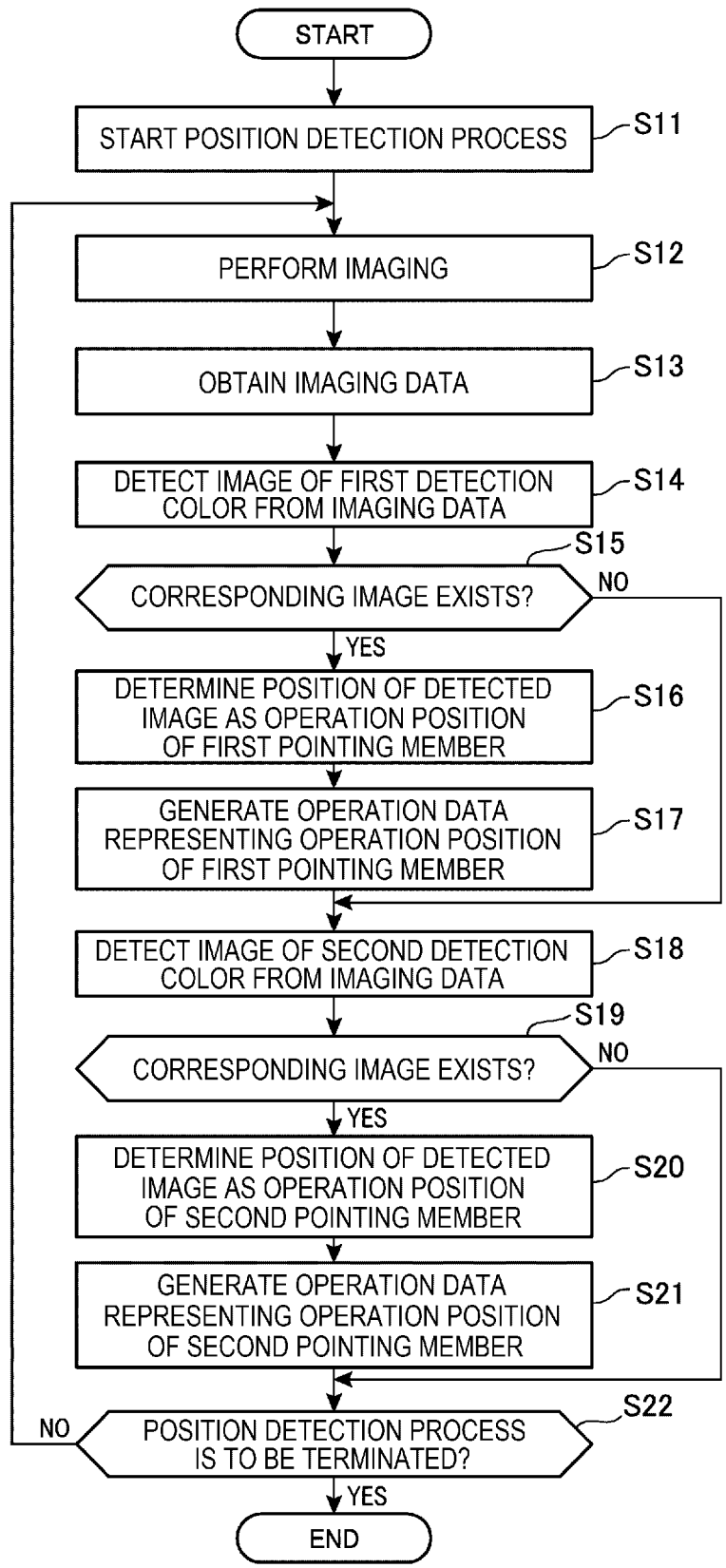
FIG. 7 is a flowchart showing an operation of a projector.

FIG. 7 is a flowchart showing the operation of the projector 1.

The position detection section 13 starts (step S11) the position detection process to make the transition to an operation state in which the operation positions of the first pointing member 6 and the second pointing member 7 can be detected. The position detection section 13 controls the imaging section 30 to perform (step S12) the imaging. The imaging section 30 performs the imaging in the step S12 in accordance with the control by the position detection section 13 to output the imaging data D to the control section 10, and the imaging data D is stored in the storage section 15.

The position detection section 13 obtains (step S13) the imaging data D, and then detects (step S14) the image of the first detection color from the imaging data D. The position detection section 13 determines (step S15) whether or not the image of the first detection color exists, and when the image of the first detection color exists (YES in the step S15), the position detection section 13 determines (step S16) the position of the image thus detected as the operation position of the first pointing member 6. The position detection section 13 converts the position of the image detected in the step S14 into a positional coordinate in the target range DA to generate (step S17) the operation data representing the operation position of the first pointing member 6.

After generating the operation data in the step S17, the position detection section 13 makes the transition of the process to the step S18. Further, when it has been determined that the image of the first detection color does not exist (NO in the step S15), the position detection section 13 makes the transition of the process to the step S18.

In the step S18, the position detection section 13 detects (step S18) the image of the second detection color from the imaging data D. The position detection section 13 determines (step S19) whether or not the image of the second detection color exists, and when the image of the second detection color exists (YES in the step S19), the position detection section 13 determines (step S20) the position of the image thus detected as the operation position of the second pointing member 7. The position detection section 13 converts the position of the image detected in the step S18 into a positional coordinate in the target range DA to generate (step S21) the operation data representing the operation position of the second pointing member 7.

After generating the operation data in the step S21, the position detection section 13 makes the transition of the process to the step S22 to determine (step S22) whether to terminate the position detection process. Further, when it has been determined that the image of the second detection color does not exist (NO in the step S19), the position detection section 13 makes the transition of the process to the step S22 to perform the determination.

When the input processing section 45 has received the operation of instructing the termination of the position detection process, or when the power OFF of the projector 1 has been instructed, the position detection section 13 determines that the position detection process is to be terminated (YES in the step S22). On this occasion, the position detection section 13 terminates the process of detecting the operation positions of the first pointing member 6 and the second pointing member 7. When the position detection section 13 has determined that the position detection process is not to be terminated (NO in the step S22), the process returns to the step S12.

The operation data generated by the position detection section 13 in the steps S17, S20 can be used for a variety of processes by the projector 1. For example, it is also possible for the projector 1 to perform a process of drawing an image with the control section 10, and projecting the image with the projection section 20 in accordance with the trajectory of the operation position of the first pointing member 6 or the second pointing member 7. Here, the drawing process performed by the control section in accordance with the operation position of the first pointing member 6 corresponds to a first process, and the drawing process performed by the control section in accordance with the operation position of the second pointing member 7 corresponds to a second process. Specifically, when the operation data representing that the operation position of the first pointing member 6 is P1 is generated in the step S17, then the position detection is not terminated (NO in the step S22), and then the operation data representing that the position P2 different from P1 is the operation position of the first pointing member 6 is generated by the position detection section 13 in the step S17, it is possible to perform a process of drawing a line connecting P1 and P2 with the control section 10, and then projecting the line with the projection section 20. It is also possible to draw a line in accordance with the operation positions of the second pointing member 7, and then project the line with the projection section 20 in substantially the same flow. In this case, by the user operating the first pointing member 6 and the second pointing member 7, it is possible for the projector 1 to draw an image or a figure in accordance with the operation. It is possible for the position detection section 13 to detect the operation position of the first pointing member 6 and the operation position of the second pointing member 7 from the imaging data D obtained by the imaging section 30 in a single imaging operation so as to be distinguished from each other. Therefore, it is possible to perform the process of drawing an image in accordance with the operation of the first pointing member 6 and the process of drawing an image in accordance with the operation of the second pointing member 7. For example, it is possible to perform a process of drawing another image based on the operation of the first pointing member 6 and the operation of the second pointing member 7. Further, it is also possible for the projector 1 to output the operation data generated by the position detection section 13 to an external device through a communication device or a communication interface not shown.

As described hereinabove, the projector 1 according to the present embodiment is provided with the imaging section 30. The imaging section 30 generates the imaging data D obtained by taking the image of the first infrared light IR1 in the wavelength band B1 emitted by the first pointing member 6, the second infrared light IR2 in the wavelength band B2 emitted by the second pointing member 7, and the target range DA. The projector 1 is provided with the position detection section 13 for detecting the first position of the first pointing member 6 with respect to the target range DA and the second position of the second pointing member 7 with respect to the target range DA based on the imaging data D so as to be distinguished from each other. The imaging section 30 is provided with the image sensor 32 for outputting the detection values of first colored light, second colored light, and third colored light. The projector 1 generates the imaging data D including the detection values obtained by detecting the first infrared light IR1 and the second infrared light IR2 with the image sensor 32.

The projector 1 executes the imaging step with the imaging section 30. In the imaging step, there is generated the imaging data D obtained by taking the image of the first infrared light IR1 in the wavelength band B1 emitted by the first pointing member 6, the second infrared light IR2 in the wavelength band B2 emitted by the second pointing member 7, and at least a part of the target range DA of the position detection of the first pointing member 6 and the second pointing member 7. The projector 1 executes a detection step of detecting the first position of the first pointing member 6 with respect to the target range DA and the second position of the second pointing member 7 with respect to the target range DA based on the imaging data D generated in the imaging step so as to be distinguished from each other.

According to the position detection device related to the present disclosure, and the projector 1 which is related to the present disclosure and to which the position detection method related to the present disclosure is applied, it is possible to detect the operation position of the first pointing member 6 and the operation position of the second pointing member 7 from the imaging data D so as to be distinguished from each other. Since the imaging data D includes the detection values obtained by detecting the first infrared light IR1 and the second infrared light IR2 with the image sensor 32, the operation positions of the first pointing member 6 and the second pointing member 7 can be detected so as to be distinguished from each other using the imaging data D obtained by the imaging section 30 in a single imaging operation. Therefore, the projector 1 which detects the operation positions of the plurality of pointing members each emitting light so as to be distinguished from each other can be realized with a simple configuration.

Here, the target range DA is a range to be a target of the detection of the positions of the first pointing member 6 and the second pointing member 7, and can also be reworded as a detection range.

In the projector 1, the image sensor 32 is provided with the plurality of light receiving elements 33 as the detection pixels. The imaging section 30 outputs the imaging data D including the detection values of the first colored light, the second colored light, and the third colored light corresponding to each of the light receiving elements 33. The first colored light, the second colored light, and the third colored light are, for example, the red light, the blue light, and the green light. The position detection section 13 detects the operation position of the first pointing member 6 and the operation position of the second pointing member 7 from the single piece of imaging data D including the single detection value corresponding to each of the detection pixels. Therefore, it is possible for the position detection section 13 to detect each of the image of the first infrared light IR1 emitted by the first pointing member 6 and the image of the second infrared light IR2 emitted by the second pointing member 7 so as to be distinguished from each other based on the detection values of the first colored light, the second colored light, and the third colored light from the imaging data D. Therefore, it is possible to promptly detect the detection positions of the two pointing members, namely the first pointing member 6 and the second pointing member 7, using the single piece of imaging data D.

The image sensor 32 has the sensitivity characteristic in which the relative sensitivity of the first colored light, the second colored light, and the third colored light in the wavelength band B1 does not coincide with the relative sensitivity of the first colored light, the second colored light, and the third colored light in the wavelength band B2. Therefore, in the imaging data D, it is possible to distinguish the image of the first infrared light IR1 emitted by the first pointing member 6 and the image of the second infrared light IR2 emitted by the second pointing member 7 from each other as the images different in the components of the first colored light, the second colored light, and the third colored light from each other. Therefore, the detection positions of the two pointing members, namely the first pointing member 6 and the second pointing member 7, can easily be distinguished from each other in the imaging data D, and thus can promptly be detected.

Further, the wavelength band B1 includes a shorter wavelength than in the wavelength band B2. The imaging section 30 is provided with the optical filter 36 for cutting the light in the wavelength band shorter in wavelength than the wavelength band B1, and the image sensor 32 detects the light transmitted through the optical filter 36. Therefore, it is possible to reduce the influence of the light in the wavelength band shorter in wavelength than the wavelength band B1 to promptly detect the image of the first infrared light IR1 and the image of the second infrared light IR2 from the imaging data D.

The optical filter 36 can be provided with a configuration of cutting the light with the wavelength in the ultraviolet region. In this case, it is possible to eliminate the influence of the incident light OL in the ultraviolet region to more promptly detect the image of the first infrared light IR1 and the image of the second infrared light IR2 from the imaging data D.

The projector 1 as a display device is provided with the projection section 20 for displaying the image based on the image data on the display surface. The projector 1 is provided with the imaging section 30, the position detection section 13, and the control section 10 as a processing section for performing the first process corresponding to the first position and the second process corresponding to the second position. Therefore, it is possible to distinguish the first position and the second position from each other to promptly detect the first position and the second position, and it is possible to promptly perform the first process and the second process based on the positions thus detected.

The control section 10 as the processing section performs processes of performing drawings different from each other as the first process and the second process. Specifically, it is possible for the control section 10 to draw an image corresponding to the trajectory of the operation position of the first pointing member 6 as the first process, and draw an image corresponding to the trajectory of the operation position of the second pointing member 7 as the second process.

The projection system 100 functions as a display system having the projector 1 provided with the projection section 20 for displaying the image based on the image data on the display surface, and the first pointing member 6 and the second pointing member 7 used for the position pointing operation in the screen SC. The first pointing member 6 emits the first infrared light IR1 in the wavelength band B1, and the second pointing member 7 emits the second infrared light IR2 in the wavelength band B2. In the projection system 100, it is possible to perform the position pointing operation using each of the first pointing member 6 and the second pointing member 7. Further, it is possible for the projector 1 to distinguish the first position as the operation position of the first pointing member 6 and the second position as the operation position of the second pointing member 7 from each other to promptly detect the first position and the second position.

Further, since the first infrared light IR1 emitted by the first pointing member 6 and the second infrared light IR2 emitted by the second pointing member 7 are the light beams outside the visible region, there is an advantage that it is possible for the user to use the device without regard to the light beams emitted by the first pointing member 6 and the second pointing member 7. Further, there is an advantage that it is possible to adopt a configuration of blocking the light in the visible region in the incident light OL, and there is no chance for the light in the visible region included in the incident light OL to exert a harmful influence on the detection of the first pointing member 6 and the second pointing member 7. In other words, the projection system 100 has an advantage that it is difficult to be affected by the environmental light in the detection of the first pointing member 6 and the second pointing member 7.

The first pointing member 6 is provided with the first switch 66 for detecting the operation, the first light source 64, and the first light emission control section 65 for making the first light source 64 emit light when the first switch 66 has detected the operation. The second pointing member 7 is provided with the second switch 76 for detecting the operation, the second light source 74, and the second light emission control section 75 for making the second light source 74 emit light when the second switch 76 has detected the operation. Therefore, the first pointing member 6 emits the first infrared light IR1 when the operation has been detected by the first switch 66, and the second pointing member 7 emits the second infrared light IR2 when the operation has been detected by the second switch 76. Therefore, it is possible for the projector 1 to detect the operation position when the operation of the first pointing member 6 has been performed, and the operation position when the operation of the second pointing member 7 has been performed so as to be distinguished from each other. Therefore, it is possible to promptly detect presence or absence of the operation of the first pointing member 6 and the second pointing member 7, and the operation positions.

Other Embodiments

The embodiment described above shows a specific example to which the present disclosure is applied, and the present disclosure is not limited to the embodiment.

In the embodiment described above, there is illustrated the configuration in which the first pointing member 6 and the second pointing member 7 emit the light when the operations have been detected by the first switch 66 and the second switch 76, respectively. The present disclosure is not limited to this configuration, but it is also possible to adopt a configuration in which the first pointing member 6 emits the first infrared light IR1 in the state in which the first switch 66 has not been operated. Further, it is also possible for the first switch 66 to be provided with a configuration of switching a plurality of infrared light beams with respective wavelengths to be emitted, and it is also possible to adopt a configuration of, for example, switching the wavelengths of the infrared light emitted from the first light source 64 between the state in which the first switch 66 has not been operated and the state in which the first switch 66 has been operated. As described above, the imaging section 30 is provided with the image sensor 32 for detecting the plurality of infrared light beams different in wavelength from each other with the different relative sensitivity. Therefore, it is possible for the position detection section 13 to detect the operation position of the first pointing member 6 and presence or absence of the operation of the first switch 66 based on the imaging data D. The same applies to the second pointing member 7.

Further, in the embodiment described above, the values illustrated as the wavelengths of the first infrared light IR1 and the second infrared light IR2 are illustrative only, and it is possible to adopt wavelengths different from those in the example described above. Further, it is also possible to adopt a configuration of using three or more pointing members in the projection system 100, and in this case, it is sufficient for the light beams emitted by the respective pointing members to be light beams out of the visible region and in the wavelength band where the relative sensitivity characteristics of R, G, and B of the image sensor 32 are different from each other.

Further, the configuration of each of the first pointing member 6 and the second pointing member 7 is arbitrary, and for example, it is also possible to adopt a configuration provided with a plurality of light sources, or a configuration provided with a plurality of first switches 66 or a plurality of second switches 76. Further, the shape of each of the first pointing member 6 and the second pointing member 7 is not limited to the pen type, but it is also possible to adopt, for example, a shape to be mounted on a finger or a hand of the user.

Further, although in the embodiment described above, there is illustrated the configuration in which the target range DA coincides with the projection image PS, the present disclosure is not limited to this configuration. The target range DA preferably includes a part of the projection image PS, but is not required to coincide with the projection image PS, and can also include the projection image PS and the periphery of the projection image PS, or it is also possible to adopt a configuration in which a part of the projection image PS forms the target range DA.

Further, the display device according to the present disclosure is not limited to the projector 1, but a liquid crystal monitor or a liquid crystal television set for displaying an image on a liquid crystal panel can also be used as the display device, or it is also possible to use devices adopting other display types.

Figure 8:
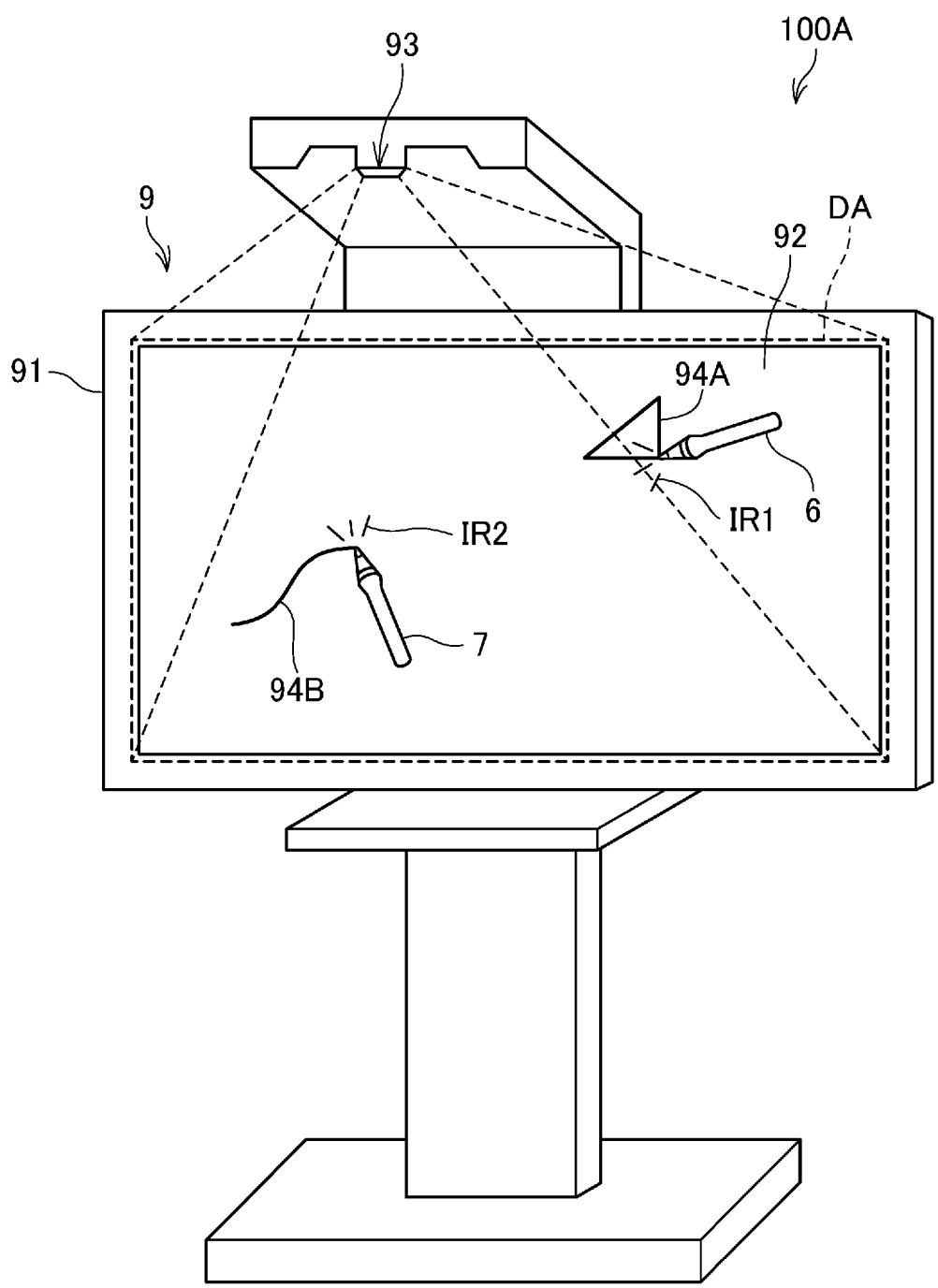
FIG. 8 is a diagram showing a configuration of a projection system as a modified example.

FIG. 8 is a diagram showing a configuration of a projection system 100A as a modified example to which the present disclosure is applied.

The projection system 100A shown in FIG. 8 is a system having a display 9, the first pointing member 6, and the second pointing member 7 combined with each other. In the display 9, a main body 91 is provided with a display surface 92. The display surface 92 is formed of a liquid crystal display panel, a plasma display panel, an OLED (organic light-emitting diode), an OEL (organic electro-luminescence) display, or the like. The display 9 is a display device for displaying an image on the display surface 92 similarly to the projector 1.

Above the main body 91 of the display 9, there is disposed an imaging section 93. The imaging section 93 is a digital camera similarly to the imaging section 30.

On the display surface 92, there is set the target range DA. The target range DA is a target area where operations of the first pointing member 6 and the second pointing member 7 are detected. The imaging section 93 is disposed so as to take an image of the target range DA, and it is preferable for the imaging section 93 to take an image of the whole of the target range DA.

Similarly to the embodiment described above, the first pointing member 6 emits the first infrared light IR1, and the second pointing member 7 emits the second infrared light IR2. The display 9 detects the pointing position of the first pointing member 6 and the pointing position of the second pointing member 7 based on the taken image obtained by taking the image of the target range DA with the imaging section 93, and then performs the process based on the positions thus detected. For example, the display 9 draws an image 94A along the trajectory of the pointing position of the first pointing member 6, draws an image 94B along the trajectory of the pointing position of the second pointing member 7, and then display the images on the display surface 92.

As described above, the specific aspect of the display device according to the present disclosure can arbitrarily be modified, and it is possible to obtain substantially the same advantages as those of the configuration described in the above embodiment in a variety of aspects.

Further, each of the functional sections shown in FIG. 2 and FIG. 3 is for showing the functional configuration, and the specific implementation configuration is not particularly limited. In other words, it is not necessarily required to install the hardware corresponding individually to each of the functional sections, but it is obviously possible to adopt a configuration of realizing the functions of the plurality of functional sections by a single processor executing a program. Further, it is also possible to adopt a configuration in which a plurality of processors cooperates with each other to realize the function of one of the functional sections or the functions of two or more of the functional sections. Further, apart of the function realized by software in the embodiment described above can also be realized by hardware, or a part of the function realized by hardware can also be realized by software. Besides the above, the specific detailed configuration of each of the sections constituting the projection system 100 can arbitrarily be modified within the scope or the spirit of the present disclosure.

What is claimed is:

1. A position detection device comprising:
   a camera configured to generate imaging data obtained by taking an image of first infrared light with a first wavelength emitted by a first pointing member, second infrared light with a second wavelength emitted by a second pointing member, and a target range;
   one or more processors programmed to:
      detect a first position of the first pointing member with respect to the target range and a second position of the second pointing member with respect to the target range based on the imaging data so as to be distinguished from each other, wherein
   the camera includes a sensor configured to output detection values of first colored light, second colored light, and third colored light to generate the imaging data including the detection values obtained by detecting the first infrared light and the second infrared light with the sensor, and
   the camera includes an optical filter configured to simultaneously allow the first infrared light with the first wavelength and the second infrared light with the second wavelength pass through to the sensor.

2. The position detection device according to claim 1, wherein
   the sensor is formed of an image sensor including a plurality of detection pixels, the camera outputs the imaging data including the detection values of the first colored light, the second colored light, and the third colored light corresponding to each of the detection pixels, and
   the one or more processors detects the first position and the second position from one piece of the imaging data including the one detection value corresponding to each of the detection pixels.

3. The position detection device according to claim 1, wherein
   the sensor has a sensitivity characteristic in which relative sensitivity of the first colored light, the second colored light, and the third colored light at the first wavelength fails to coincide with relative sensitivity of the first colored light, the second colored light, and the third colored light at the second wavelength.

4. The position detection device according to claim 1, wherein
   the first wavelength includes a wavelength shorter than the second wavelength, and
   the optical filter is configured to cut light in a wavelength band shorter in wavelength than the first wavelength, and the sensor detects light transmitted through the optical filter.

5. The position detection device according to claim 4, wherein
   the optical filter cuts light with a wavelength in an ultraviolet region.

6. The position detection device according to claim 4, wherein
   the camera includes a first color filter, and
   the sensor detects light transmitted through the optical filter and the first color filter.

7. The position detection device according to claim 1, wherein the sensor is configured to detect first colored light, second colored light, and third colored light.

8. A display device comprising:
   an image display section configured to display an image based on image data on a display surface;
   a camera configured to generate imaging data obtained by taking an image of first infrared light with a first wavelength emitted by a first pointing member, second infrared light with a second wavelength emitted by a second pointing member, and at least a part of the display surface;
   one or more processors programmed to:
      detect a first position of the first pointing member with respect to the display surface and a second position of the second pointing member with respect to the display surface based on the imaging data so as to be distinguished from each other; and
      perform a first process corresponding to the first position and a second process corresponding to the second position, wherein
   the camera includes a sensor configured to output detection values of first colored light, second colored light; and third colored light to generate the imaging data including the detection values obtained by detecting the first infrared light and the second infrared light with the sensor, and
   the camera includes an optical filter configured to simultaneously allow the first infrared light with the first wavelength and the second infrared light with the second wavelength pass through to the sensor.

9. The display device according to claim 8, wherein
the one or more processors performs processes of performing drawings different from each other as the first process and the second process.

10. The display device according to claim 8,
wherein the sensor is configured to detect first colored light, second colored light, and third colored light.

11. A display system comprising:
a display device including an image display section configured to display an image based on image data on a display surface; and
a first pointing member and a second pointing member used for a position pointing operation on the display surface, wherein
the first pointing member emits first infrared light with a first wavelength,
the second pointing member emits second infrared light with a second wavelength,
the display device includes
a camera configured to generate imaging data obtained by taking an image of the first infrared light emitted by the first pointing member, the second infrared light emitted by the second pointing member, and at least a part of the display surface,
one or more processors programmed to:
detect a first position of the first pointing member with respect to the display surface and a second position of the second pointing member with respect to the display surface based on the imaging data so as to be distinguished from each other, and
perform a first process corresponding to the first position and a second process corresponding to the second position, and
the camera includes an optical sensor configured to output detection values of first colored light, second colored light, and third colored light to generate the imaging data including the detection values obtained by detecting the first infrared light and the second infrared light with the optical sensor, and
the camera includes an optical filter configured to simultaneously allow the first infrared light with the first wavelength and the second infrared light with the second wavelength pass through to the optical sensor.

12. The display system according to claim 11, wherein
the first pointing member and the second pointing member each include an operation sensor configured to detect an operation, a light source, and a light emission control section configured to make the light source emit light when the operation sensor detected the operation.

13. The display system according to claim 11,
wherein the optical sensor is configured to detect first colored light, second colored light, and third colored light.

14. A position detection method comprising:
generating imaging data obtained by taking an image of first infrared light with a first wavelength emitted by a first pointing member, second infrared light with a second wavelength emitted by a second pointing member, and a target range; and
detecting a first position of the first pointing member with respect to the target range and a second position of the second pointing member with respect to the target range based on the imaging data so as to be distinguished from each other, wherein
the generating the imaging data comprising using a camera including a sensor configured to output detection values of first colored light, second colored light, and third colored light to generate the imaging data including the detection values obtained by detecting the first infrared light and the second infrared light with the sensor, and
the camera includes an optical filter configured to simultaneously allow the first infrared light with the first wavelength and the second infrared light with the second wavelength pass through to the sensor.

15. The position detection method according to claim 14,
wherein the sensor is configured to detect first colored light, second colored light, and third colored light.

* * * * *